Figure 1:
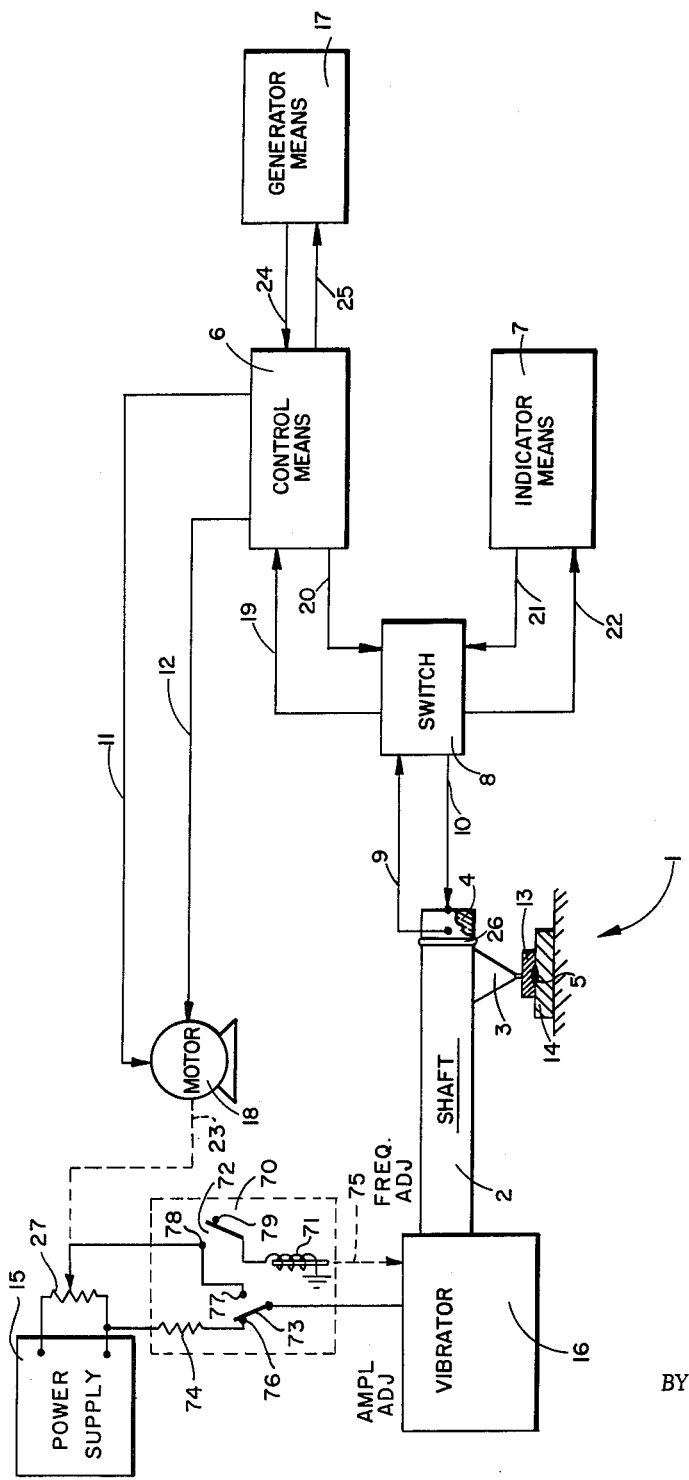

Oct. 19, 1965  S. W. MacGREGOR  3,212,695
WELDING CONTROL DEVICE
Filed Oct. 3, 1962

INVENTOR.
SANDRA W. MacGREGOR
BY L. Lee Humphries
ATTORNEY

United States Patent Office 3,212,695
Patented Oct. 19, 1965

3,212,695
WELDING CONTROL DEVICE
Sandra W. MacGregor, Bellflower, Calif., assignor to
North American Aviation, Inc.
Filed Oct. 3, 1962, Ser. No. 228,139
6 Claims. (Cl. 228—1)

This invention relates to a control device and more particularly to a device for controlling the joining of metals by measuring the vibration frequency and amplitude of the joining tip.

Present art welding systems employing mechanical vibration have the problem of controlling a weld schedule to minimize the possibility of imperfectly joined metal surfaces. Failure to provide means for controlling a weld schedule within narrow tolerances often results in damaging the pieces of metal being joined because of overheating, underheating, voids, surface distortion and other such factors. Present art apparatus affords limited control of the weld schedule by probing the areas being welded together. Oscillations are transmitted through the area being joined and control is exercised depending on the resistance of the area to the oscillation. Apparatus of this type has the disadvantage of detecting a defect only after the defect has been formed in the welded area. The possibilities of overheating, etc., are again encountered in attempting to overcome the defective weld. Applicant's device overcomes the defects of the prior art by maintaining control of the weld schedule at a point in time preceding the time at which the energy is passed from a welding tip through the pieces of metal being joined.

In the device of this invention, a joining tip of a joining machine is driven at a predetermined frequency rate by vibration induced in its support shaft by vibrating means such as a mechanical drive or piezoelectric crystal driver. The vibrating means is activated and controlled by energy from a power supply. Electrical energy from the power supply is converted into mechanical vibrations and conducted via the support shaft to the joining tip. A piezoelectric crystal sensor mounted on the support shaft develops an electrical signal proportional to the force developed by the mechanical vibration which is dependent on the amplitude and frequency thereof. The detected signal is applied to indicator means such as an oscilloscope, voltmeter, or to control means such as a motor controller for controlling the frequency and amplitude of the shaft vibration. If it is determined that the frequency and/or amplitude needs adjusting, the power supply is manually adjusted or if the control means is used, the crystal signal is electrically inspected by circuitry for deviation from required tolerances; if deviation occurs, the control means generates an error signal to cause an adjustment of the power supply until the crystal signal is again within tolerance. Required tolerances are determined by inspection of a weld schedule. By changing the amount of energy supplied to the vibrating means, the welded area and quality thereof are controlled. Joining tip pressure may be manually adjusted to effect an additional control of the vibration.

It is therefore an object of this invention to control the weld schedule of a welding machine by controlling amplitude and frequency of welding tip vibration.

It is another object of this invention to provide means for making a weld joint which is free from defects.

It is still another object of this invention to provide a welding control device in which the heating of the metal areas to be joined is maintained within an optimum temperature range.

It is still a further object of this invention to provide means for controlling the welding energy before such energy causes an imperfect weld.

Other objects will become apparent from the following description taken in connection with the accompanying drawings of which FIG. 1 is a schematic diagram of a preferred embodiment of the device of the invention.

Joining tip 3, connected to shaft 2 of joining machine 1, is pressed against the top surface of metal workpiece 13 such that the metal workpiece 13 is pressed against a surface of metal workpiece 14, the two metals being pressed together at area 5. Shaft 2 is caused to vibrate by vibrating means 16 which may be comprised of a piezoelectric crystal driver or other mechanical driving means such as a motor driven vibrator. Energy applied from power supply 15 of joining machine 1 passes through shaft 2 to joining tip 3 and through metal workpieces 13 and 14 at area 5. The amplitude and frequency of the mechanical vibration of shaft 2 is sensed or detected by piezoelectric sensor 4 which may be fabricated of barium titanate, etc., and is conducted from the sensor 4 via conductor leads 9 and 10 to an indicator means 7 or motor controller means 6 depending on the setting of switch 8. The sensor is attached to the shaft by an adhesive or connector 26. Indicator means may be comprised of an oscilloscope or a voltmeter. If the indicator means indicates that the frequency or amplitude of the vibration of shaft 2 needs to be varied, then some adjustment must be made to the joining machine 1 to increase or decrease such amplitude or frequency. The adjustment is accomplished by manually varying the quantity of energy from power supply 15 to the vibrating means. Energy flow is controlled for example by changing a potentiometer setting on power supply 15 by changing potentiometer control arm 27 setting. As an example, power across potentiometer 27 may be used to set up a magnetic field such as that in a solenoid type coil to mechanically adjust a variable capacitor to change the frequency of a frequency oscillator. Switches may be employed to cut out either the frequency control or the amplitude control in order that frequency and/or amplitude may be controlled as set forth. For example, means 70 for increasing or decreasing the frequency and/or amplitude of the vibration of the welding control device in response to the output signal may comprise solenoid coil 71, resistor 74, mechanical linkage 75, and switches 72 and 73. If switch 72 is in position 78, the frequency is automatically adjusted by the change in setting of potentiometer 27. Amplitude is automatically adjusted whenever switch 73 is in position 77. Amplitude may be adjusted independent of the frequency by setting switch 73 from position 76 to position 77 and switch 72 from position 78 to position 79.

The mechanical linkage 75 may be connected to a variable capacitor or inductor to change the frequency or frequency producing means. Also, it should be obvious that the mechanical linkage could be connected to adjust tension on vibrator shaft 2 to vary the frequency vibration.

The details of such vibrator frequency and/or amplitude adjustment form no part of the invention and are well within design capability of those skilled in the art to which the invention pertains. When the switch 8 is set to connect control means 6 to the output of sensor 4, if the frequency and amplitude of the signal received by the control means is below that required by a pre-set welding schedule, then an error signal from control means 6 is conducted via leads 11 and 12 to servomotor 18 to cause a rotation of motor shaft 23 which is connected to power supply 15. The shaft rotation causes a change, either an increase or decrease, in the energy supplied vibrating means 16 until the signal from sensor 4 is again within required tolerances so that no error signal emanates from the control means. Although means for controlling energy flow are well known in the art, one device as indicated above is a simple potentiometer connected either to the input of the power supply 15 or the output. The shaft of the servomotor, connected to the potentiometer control arm 27, causes a change in the voltage by rotation drop and hence a change in the energy output. Servo motors in general are well described in the literature and an example of a type which may be utilized in the device of this invention is illustrated in FIG. D-1, page 387 of "Servo Mechanism Analysis," Thaler & Brown, 1953 by McGraw-Hill, Inc. Servo motor 18 is controlled by an error signal generated by amplitude and frequency sensitive control means 6. A fixed reference signal which is initially adapted to be adjusted to the desired frequency and amplitude of the welding schedule is generated from generator 17 to control means 6 for comparison with the signal from piezoelectric sensor 4. The reference signal determined by a weld signal is supplied by frequency generator 17. In order to achieve the accuracy required in this invention, the generator must be extremely accurate. A crystal control oscillator as illustrated by FIGS. 18 and 19 on page 354 of "Vacuum-Tube Circuits and Transistors," copyrighted 1956 by Lawrence Baker Arguimbau, in conjunction with appropriate amplifiers is an example of a circuit which will satisfy the accuracy requirements. If the signal from the sensor differs in frequency relationship or amplitude from the reference signal, the error signal to drive motor 18 is generated. When the signals are identical no error signal is generated. Discriminators or comparators in conjunction with common amplifiers and/or bridge circuits which may be used for this application are well known in the art. An example of discriminator circuits may be found by reference to FIG. A11 on page 455 of "Introduction to the Design of Servomechanisms," copyrighted 1958 by John Wiley & Sons, Inc., FIGS. 12-31 on page 381 of "Engineering Electronics" copyrighted 1953 by McGraw-Hill, Inc., or FIGS. 18, 19 on page 492 of "Vacuum-Tube Circuits and Transistors," copyrighted 1956 by Lawrence Baker Arguimbau.

After a predetermined length of time has elapsed, as set by welding schedule, the metals 13 and 14 are joined at area 5 and joining machine 1 is cut off. Welding schedule may be set up for example by placing two metals underneath joining tip 3. Initial data such as amount of energy required to achieve fusion of a selected metal, is found in any AWS publication such as "The Welding Handbook" published in 1959 by American Welding Society. Generally used data is well known in the art and will not be repeated in this application. Beginning with this initial data, trial and error tests are run to determine the exact weld schedule for various metal specimens which might be welded, wherein all but one of the variables is held constant to determine the optimum point of that variable. This process is repeated until a weld schedule is developed. A weld schedule for the particular sample of metal welded would be the optimum of the results of the variation of energy, vibration amplitude of shaft 2, frequency of vibration of shaft 2, and pressure of the joining tip 3 on the metal samples to be welded together and many other factors.

*Summary*

The combination of a joining machine including a shaft and a tip, a piezoelectric sensor, indicator and/or control means including suitable means for connecting either or both simultaneously to the sensor, form the device of this invention. The combination used with a predetermined welding schedule monitors the frequency and amplitude of the shaft of the joining machine and regulates the frequency and amplitude within predetermined tolerances to achieve a welding of metals free from cracks, holes and other imperfections. The predetermined tolerances are derived from a prepared weld schedule for the particular metals involved.

Although the invention has been described and illustrated in detail, it is to be clearly understood that the same is by way of illustration and example only, and is not to be taken by way of limitation; the spirit and scope of this invention being limited only by the terms of the appended claims.

I claim:

1. A welding control device comprising: A joining machine having means for generating a predetermined amount of energy, joining tip means, means for conducting said energy to said tip means, means for vibrating said conducting means and said tip means at a predetermined frequency rate and amplitude; means for detecting the amplitude and frequency of said vibration; and means responsive to said detecting means for adjusting said frequency and/or amplitude.

2. A device as recited in claim 1 wherein said conducting means comprises a shaft attached to said joining machine and wherein said detecting means comprises a piezoelectric sensor fixedly attached to said shaft, said joining tip also being attached to said shaft.

3. A welding control device comprising a joining machine having power supply means for generating a predetermined amount of energy, shaft means fixedly attached to said joining machine, tip means fixedly attached to said shaft means, means for conducting said energy from said power supply means through said shaft means to said tip means, means for vibrating said shaft and tip means at a predetermined frequency and amplitude, said welding control device further comprising means for sensing said vibrations and for generating an output signal proportional thereto, including control means for raising and lowering said amplitude and/or frequency of said vibration in response to said output signal.

4. A device as recited in claim 3 wherein said means for sensing comprises piezoelectric crystal means fixedly attached to said shaft means, and wherein said control means is connected to said joining machine and said piezoelectric crystal means, said control means including means for inspecting said generated signal and producing an output signal proportional thereto for controlling said vibrating means if the generated signal is not within predetermined frequency and amplitude tolerances, said vibrating means including means for effecting an increase or decrease in the frequency and/or amplitude of said vibrations.

5. In combination: A joining machine, a piezoelectric sensor, indicator means, said joining machine comprising energy generating means, shaft means attached to said joining machine, tip means attached to said shaft means, means for vibrating said shaft means and tip means and said piezoelectric sensor simultaneously at a predetermined frequency and amplitude, means for conducting said energy from said energy generating means through said shaft means and said piezoelectric sensor to said tip means, said piezoelectric sensor being fixedly attached to said shaft means for detecting said frequency and amplitude vibrations, said sensor generating a signal in response to said vibrations and proportional thereto, said indicator means including means for displaying said signal, control means for producing an output signal if said generated signal from said piezoelectric sensor is outside of weld schedule tolerances, said control means including means for increasing or decreasing the frequency and/or amplitude of said vibrations in response to said output signal.

6. In combination: A joining machine comprising a shaft, a joining tip attached to said shaft, a power supply for generating a variable amount of energy over a predetermined period of time, driving means activated by said energy attached to said shaft for vibrating said shaft and said tip at a predetermined frequency and amplitude, a piezoelectric sensor fixedly attached to said shaft, said sensor producing an output signal proportional to said vibrating shaft and simultaneous with the vibration of said shaft, control means connected to said piezoelectric sensor and to said joining machine including motor means, generator means for generating a reference signal having a fixed reference signal of frequency and amplitude, said generator means being connected to said control means for supplying said reference signal to said control means, said control means including means for comparing the signal from said piezoelectric sensor with said reference signal and for producing an error signal if said signals are not identical in frequency and amplitude, said error signal being used as a drive signal to produce a corresponding increase or decrease in said frequency and amplitude vibrations of said shaft until said signals are identical.

References Cited by the Examiner
UNITED STATES PATENTS 3,056,192  10/62  Jones _____ 29—470

CHARLES W. LANHAM, *Primary Examiner.*

WILLIAM J. STEPHENSON, *Examiner.*